United States Patent [19]
Henderson et al.

[11] Patent Number: 5,801,967
[45] Date of Patent: *Sep. 1, 1998

[54] METHOD FOR DETERMINING THE VOLUME BETWEEN PREVIOUS AND CURRENT SITE SURFACES

[75] Inventors: Daniel E. Henderson, Washington; Karl W. Kleimenhagen; Craig L. Koehrsen, both of Peoria; Kevin J. Lueschow, Edwards; Kenneth L. Stratton, Dunlap, all of Ill.

[73] Assignee: Caterpillar Inc., Peoria, Ill.

[*] Notice: The term of this patent shall not extend beyond the expiration date of Pat. No. 5,493,494.

[21] Appl. No.: 626,230

[22] Filed: Mar. 29, 1996

[51] Int. Cl.$^6$ .................................................. G01C 21/00
[52] U.S. Cl. .............. 364/564; 364/424.01; 364/424.07; 364/460; 342/357; 340/988; 340/990
[58] Field of Search .................. 172/2, 826; 364/424.07, 364/564; 342/357, 462, 449; 360/78.14; 37/348

[56] References Cited

U.S. PATENT DOCUMENTS

| | | | |
|---|---|---|---|
| 5,146,374 | 9/1992 | Sakurai | 360/78.14 |
| 5,210,540 | 5/1993 | Masumoto | 342/357 |
| 5,404,661 | 4/1995 | Sahm et al. | 37/348 |
| 5,438,771 | 8/1995 | Sahm et al. | 37/348 |
| 5,467,541 | 11/1995 | Greer et al. | 37/348 |
| 5,493,494 | 2/1996 | Henderson | 364/424.07 |
| 5,560,431 | 10/1996 | Stratton | 172/2 |

FOREIGN PATENT DOCUMENTS

| | | |
|---|---|---|
| 961873 | 6/1964 | United Kingdom . |
| 1000747 | 8/1965 | United Kingdom . |

*Primary Examiner*—James P. Trammell
*Assistant Examiner*—Shah S. Kamini
*Attorney, Agent, or Firm*—S. L. Noe; James R. Yee

[57] ABSTRACT

A method for calculating a volume between previous and current site surfaces is provided. The site surfaces are represented by a series of surface elevations. The method includes the steps of determining previous surface elevations; traversing the site with a work machine and determining current surface elevations; and calculating a volume difference between the current surface and the previous surface as a function of the previous surface elevations and the current surface elevations.

14 Claims, 3 Drawing Sheets

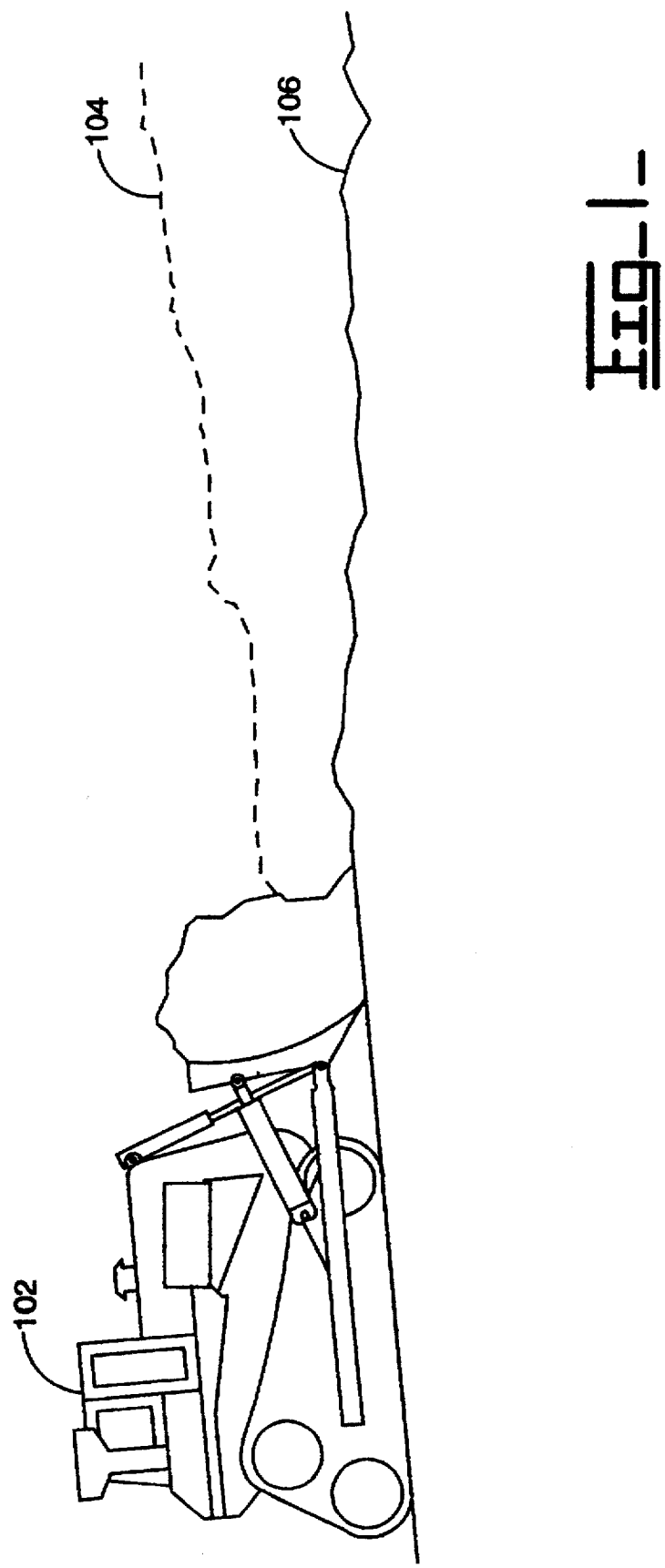

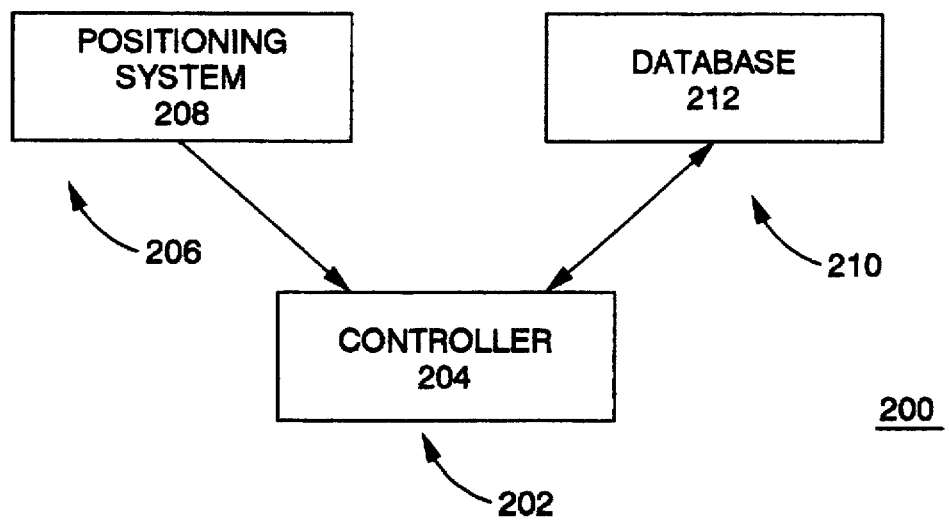
Fig_2_
| 304A | 304E | 304I | 304M | 304Q |
| --- | --- | --- | --- | --- |
| 304B | 304F | 304J | 304N | 304R |
| 304C | 304G | 304K | 304O | 304S |
| 304D | 304H | 304L | 304P | 304T |
Fig_3_

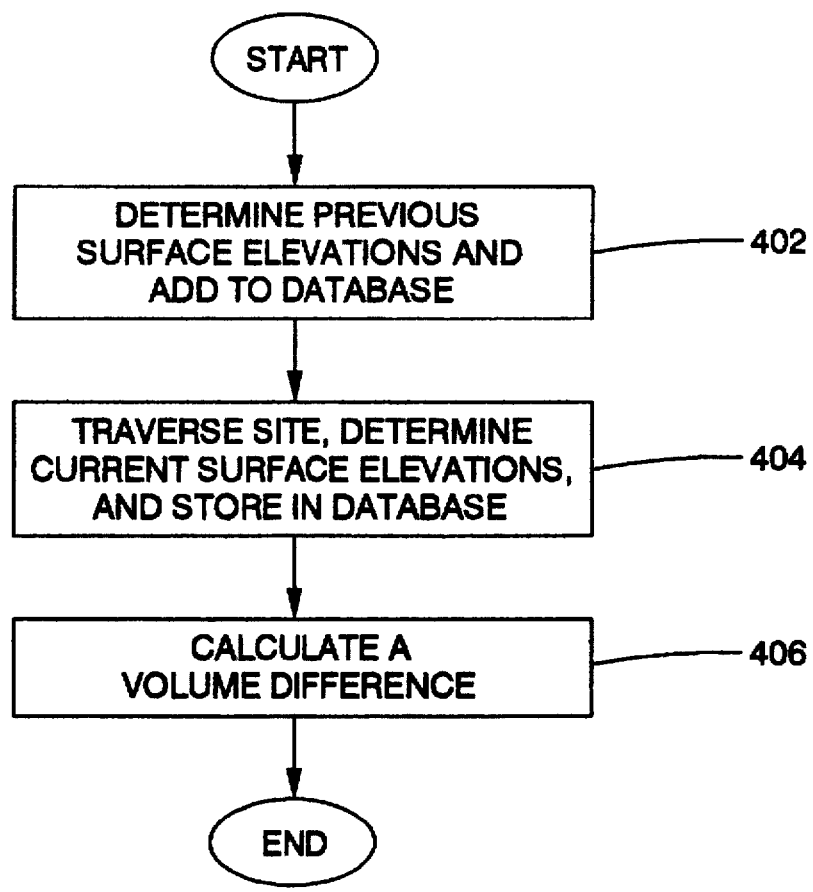
Fig_4_
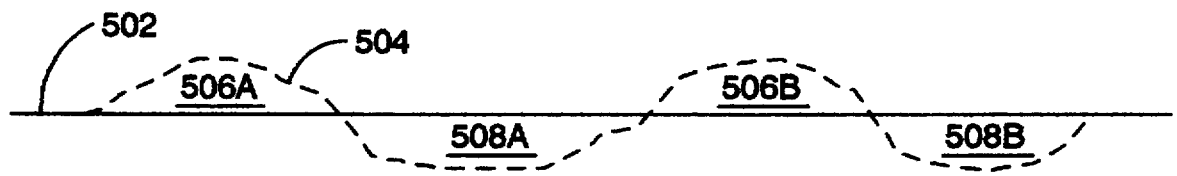
Fig_5_

5,801,967

METHOD FOR DETERMINING THE VOLUME BETWEEN PREVIOUS AND CURRENT SITE SURFACES

TECHNICAL FIELD

The present invention relates generally to earthmoving machines, and more particularly, to a method for comparing a current site surface with a previous site surface.

BACKGROUND ART

Computer based aids for earthmoving machines are becoming more common. For example, systems are being developed which utilize the Global Positioning System (GPS) satellites for determining the position of the machine and even the position of an earthmoving tool.

Other systems compile a data base of this position information. The database is continuously updated as the earthmoving machine modifies the site. One such system is disclosed in U.S. application Ser. No. 08/322,816 filed one Oct. 13, 1994 (Attorney Docket No. 94-245) now U.S. Pat. No. 5,493,494.

In any type of earthmoving operation, it is desirable to have a measure of productivity.

The present invention is directed to overcome one or more of the problems as set forth above.

DISCLOSURE OF THE INVENTION

In one aspect of the present invention, a method for calculating a volume between previous and current site surfaces is provided. The site surfaces are represented by a series of surface elevations. The method includes the steps of determining previous surface elevations; traversing the site with a work machine and determining current surface elevations; and calculating a volume difference between the current surface and the previous surface as a function of the previous surface elevations and the current surface elevations.

BRIEF DESCRIPTION OF THE DRAWINGS

FIG. 1 is a diagrammatic illustration of an earthmoving machine operating on a work site;

FIG. 2 is a block diagram of an apparatus for performing the present invention;

FIG. 3 is an illustration of one representation of the site, according to an embodiment of the present invention;

FIG. 4 is a flow diagram illustrating a method for calculating a volume difference, according to an embodiment of the present invention; and, FIG. 5 is a side view of a work site illustrating cut and fill volumes.

BEST MODE FOR CARRYING OUT THE INVENTION

With reference to FIG. 1, the present invention provides a method for calculating the volume between previous and current site surfaces. An earthmoving machine 102 may be manually, autonomously, or semi-autonomously operated to modify the site surface. The earthmoving machine 102 is shown in FIG. 1 as a track-type tractor, although other types of earthmoving machines such as motor graders, hydraulic excavators or compactors may be substituted without departing from the spirit of the invention.

As shown in FIG. 1, the previous site surface is represented by a dotted line 104 and the current site surface is represented by a solid line 106. The previous site surface 104 may be either an initial surface or any previous site surface which has been modified by the earthmoving machine 102.

With reference to FIG. 2, the present invention is embodied in an apparatus 200. The apparatus 200 includes a calculating means 202 for calculating the volume as discussed below. In the preferred embodiment, the calculating means 202 includes a microprocessor-based controller 204.

A positioning means 206 determines the position of the surface with respect to either a global reference system or a local reference system. In the preferred embodiment, the positioning means 206 includes a positioning system 208. The positioning system 208 may include any suitable positioning system, for example, a Global Positioning System (GPS), a laser plane based system or any other suitable system or combination thereof may be used. The positioning system 208 may also include additional sensors (not shown) to enhance the accuracy of the position estimates, for example, an ultrasonic sensor located on the machine 102.

As discussed below, the calculating means 202 calculates differences between the previous and current site surfaces 104, 106. The site surfaces 104, 106 are represented by a series of elevations. The elevations are stored in a storage means 210. In the preferred embodiment, the storage means 210 includes a database 212.

A suitable system for determining the X, Y and Z position of a surface and storing the elevations in a database is disclosed in U.S. application Ser. No. 08/322,816 filed on Oct. 13, 1994 (Attorney Docket No. 94-245)U.S. Pat. No. 5,493,494, which is incorporated herein by reference.

With reference to FIG. 3, in the preferred embodiment, each site surface is represented by a grid 302 formed by a series of uniform squares 304A–304T. Each square 304A–304T has an associated elevation. The previous site surface 104 and the current site surface 106 are each represented by a grid.

It should be noted that the discussion of the calculation of the volumes as discussed below is in relation to the grid system as shown in FIG. 3. However, other types of representations of the site surfaces may be used without departing from the spirit of the invention, for example, a Triangular Irregular Network (TIN) may also be used.

With reference to FIG. 4, a flow diagram illustrating operation of the apparatus 200 is shown. In a first control block 402, the previous surface elevations are determined and added to the database. The previous surface elevations represent the previous site surface. The previous site surface may be either the initial site surface or any previous site surface modified by the earthmoving machine 102.

If the previous site surface is the initial site surface, the previous surface elevations may be determined by either manually surveying the site or traversing the site with the earthmoving machine and storing the measured elevations.

In a second control block 404, the site is traversed by the earthmoving machine 102 and the current surface elevations are determined. The current surface elevations are then stored in the database 212.

In a third control block 406, the volume difference between the current surface and the previous surface are determined as a function of the previous surface elevations and the current surface elevations.

In one embodiment, the calculated volume difference is equal to the total volume difference between the previous site surface and the current site surface. The total volume difference is determined by the equation:

$$V = A \sum_{n=1}^{n=N} (PE_n - CE_n),$$

where V is the total volume difference, A is the area of the squares in the grid, N equals the number of squares for which the volume is to be determined, $PE_n$ is the previous elevation for square n, and $CE_n$, is the current elevation for square n.

In another embodiment, a cut volume and a fill volume are determined. The cut volume refers to the total volume of material removed from the site. The fill volume refers to the total volume of material added to the site. With reference to FIG. 5, the line 502 represents the current site surface and the dotted line 504 represents the previous site surface. The volume between the previous site surface 504 and the current site surface 502 where the elevation of the previous site surface 504 is greater than the elevation of the current site surface is the cut volume. The volume where the previous site surface 504 is less than the current site surface 502 is the fill volume. As shown in FIG. 5, the total cut volume is represented by the sum of each cut volume 506A, 506B. Likewise, the total fill volume is represented by the sum of each individual fill volume 508A, 508B.

The calculation of the cut and fill volume is represented by the pseudocode listed below:

```
1  START
2     Vc = Vf = 0
3     For i = 1 to N
4        dhi = current elevation − previous elevation
5        vi = dhi · AI
6        IF dhi < 0
7           Vc = Vc + Vi
8        ELSE
9           Vf = Vf + Vi
10       END IF
11    Next i
12 END For
13 END
```

Industrial Applicability

With reference to the drawings and in operation, the present invention provides a method for calculating a volume between previous and current site surfaces. The site surfaces are represented by a series of surface elevations.

First, the initial surface must be determined. This may be done by either a manual survey or by the positioning system as discussed above.

The earthmoving machine 102 is then operated in order to modify the site surface. As the earthmoving machine 102 traverses the site, the current surface elevations are determined. The initial elevations of the initial site surface is now the previous site surface and the current surface elevations represent the current site surface. The initial site surface and the current site surface are stored in a database. Each subsequent site surface may also be stored in the database or alternately only the current and initial site surfaces may be stored.

Volumes may be calculated at any point during the operation of the earthmoving machine 102. As discussed above, the total volume difference between the initial site surface and the current site surface may be determined for the whole site. Additionally, the total volume difference may be determined for only a portion of the site. Additionally, if more than one site surface, i.e., site elevations at different times or after different cuts by the earthmoving machine 102, is stored in the database as modified by the earthmoving machine 102, then volumes may be calculated between any of the stored site surfaces.

Other aspects, objects, advantages and uses of the present invention can be obtained from a study of the drawings, disclosure and appended claims.

We claim:

1. A method for calculating a volume between previous and current site surfaces, the site surfaces being represented by a series of surface elevations, comprising:
   determining previous surface elevations, the previous surface elevations representing the previous site surface;
   traversing the site with a work machine and determining current surface elevations, the current surface elevations representing the current site surface; and
   calculating a volume difference between the current surface and the previous surface as a function of the previous surface elevations and the current surface elevations.

2. A method, as set forth in claim 1, wherein the calculating step includes the step of calculating a cut volume, said cut volume representing a volume of material removed from the site.

3. A method, as set forth in claim 2, wherein the surfaces are represented by uniformly spaced squares, each of said elevations being associated with one square.

4. A method, as set forth in claim 1, wherein the calculating step includes the step of calculating a fill volume, said fill volume representing a volume of material added to the site.

5. A method, as set forth in claim 4, wherein the surfaces are represented by uniformly spaced squares, each of said elevations being associated with one square.

6. A method, as set forth in claim 1, wherein the calculating step includes the step of calculating a cut volume and a fill volume.

7. A method, as set forth in claim 6, wherein the surfaces are represented by uniformly spaced squares.

8. A method, as set forth in claim 1, wherein the previous surface elevations are determined by surveying the site.

9. A method, as set forth in claim 1, wherein the previous surface elevations are determined using a position system located on the machine.

10. A method, as set forth in claim 1, wherein the current surface elevations are determined using a position system located on the machine.

11. A method, as set forth in claim 6, wherein the volume difference is determined as a function of the cut and fill volumes.

12. A method, as set forth in claim 1, wherein the surfaces are represented by uniformly spaced squares, each of said elevations being associated with one square.

13. A method, as set forth in claim 12, wherein the volume difference is determined by the equation:

$$V = A \sum_{n=1}^{n=N} (PE_n - CE_n),$$

where V is the total volume difference, A is the area of the squares in the grid, N equals the number of squares for which the volume is to be determined, $PE_n$, is the previous elevation for square n, and $CE_n$, is the current elevation for square n.

14. A method for calculating a volume between previous and current site surfaces, the site surfaces being represented by a series of surface elevations, comprising:

determining previous surface elevations, the previous surface elevations representing the previous site surface;

traversing the site with a work machine and determining current surface elevations, the current surface elevations representing the current site surface;

calculating one of a cut volume and a fill volume between the current surface and the previous surface as a function of the previous surface elevations and the current surface elevations, said cut volume representing a volume of material removed from the site and said fill volume representing a volume of material added to the site.

* * * * *